(12) United States Patent
Atyam et al.

(10) Patent No.: US 10,394,697 B2
(45) Date of Patent: Aug. 27, 2019

(54) FOCUS AREA INTEGRATION TEST HEURISTICS (71) Applicant: International Business Machines Corporation, Armonk, NY (US)

(72) Inventors: Balaji V. Atyam, Austin, TX (US); Nicholas E. Bofferding, Cedar Park, TX (US); Andrew J. Geissler, Pflugerville, TX (US); Michael C. Hollinger, Austin, TX (US); Sivas Srr, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 26 days.

(21) Appl. No.: 15/595,571

(22) Filed: May 15, 2017

(65) Prior Publication Data
US 2018/0329807 A1    Nov. 15, 2018

(51) Int. Cl.
*G06F 9/44* (2018.01)
*G06F 11/36* (2006.01)
*G06F 8/658* (2018.01)

(52) U.S. Cl.
CPC ........ *G06F 11/3676* (2013.01); *G06F 11/368* (2013.01); *G06F 11/3664* (2013.01); *G06F 11/3684* (2013.01); *G06F 11/3688* (2013.01); *G06F 8/658* (2018.02); *G06F 11/362* (2013.01)

(58) Field of Classification Search
None
See application file for complete search history.

(56) References Cited

U.S. PATENT DOCUMENTS

| | | | | |
|---|---|---|---|---|
| 7,506,312 B1* | 3/2009 | Girolami-Rose | ......... | G06F 8/71 717/101 |
| 7,552,361 B2* | 6/2009 | Galler | ................ | G06F 11/3684 714/38.1 |
| 7,644,398 B2 | 1/2010 | Cleaveland et al. | | |
| 7,747,987 B1* | 6/2010 | Akarte | ................ | G06F 11/3688 702/179 |
| 7,873,944 B2* | 1/2011 | Bangel | ................ | G06F 11/368 717/124 |

(Continued)

FOREIGN PATENT DOCUMENTS

CN    103019933 A    4/2013

OTHER PUBLICATIONS

Ljung, Regression Test Case Prioritization Based on Historical Test Case Performance Data, 2010.*

(Continued)

*Primary Examiner* — Insun Kang
(74) *Attorney, Agent, or Firm* — Patterson + Sheridan, LLP (57) ABSTRACT

Techniques are disclosed for identifying an optimal set of test cases of a larger test case bucket to execute on a new software release. The release includes one or more patches modifying development code of a previous release of the software, and each test case includes metadata specifying a history of the test case relative to an execution on the previous release. In each patch, it is determined, based on the metadata, whether at a test case targets the development code modified by the patch. Upon determining that the test case targets the development code, a score associated with the test case is incremented. The test cases are prioritized for execution based on score.

20 Claims, 8 Drawing Sheets

(56) References Cited

U.S. PATENT DOCUMENTS

| | | | | |
|---|---|---|---|---|
| 8,230,401 | B2* | 7/2012 | Branca | G06F 11/3688 717/135 |
| 8,473,916 | B2* | 6/2013 | Venkatraman | G06F 11/3672 717/124 |
| 8,539,282 | B1* | 9/2013 | Kabanov | G06F 11/3688 702/182 |
| 8,978,009 | B2* | 3/2015 | Mizrahi | G06F 11/3676 717/122 |
| 8,997,061 | B1* | 3/2015 | Davison | G06F 11/3688 717/124 |
| 9,026,998 | B2* | 5/2015 | Mizrahi | G06F 11/368 717/124 |
| 9,495,642 | B1* | 11/2016 | Smith | G06F 11/3684 |
| 9,946,633 | B2* | 4/2018 | Atyam | G06F 11/3616 |
| 2003/0204836 | A1* | 10/2003 | Srivastava | G06F 11/3676 717/124 |
| 2007/0010975 | A1 | 1/2007 | Fine et al. | |
| 2008/0120601 | A1* | 5/2008 | Ashida | G06F 8/71 717/124 |
| 2009/0006066 | A1* | 1/2009 | Behm | G06F 11/261 703/15 |
| 2009/0070746 | A1* | 3/2009 | Dhurjati | G06F 11/3676 717/128 |
| 2011/0004867 | A1* | 1/2011 | Holden | G06F 11/3676 717/127 |
| 2011/0289488 | A1* | 11/2011 | Ghosh | G06F 11/3684 717/131 |
| 2012/0042302 | A1* | 2/2012 | Sikandar | G06F 11/3688 717/125 |
| 2012/0192153 | A1* | 7/2012 | Venkatraman | G06F 11/3664 717/124 |
| 2012/0198421 | A1* | 8/2012 | Arumugham | G06F 11/368 717/125 |
| 2012/0226465 | A1* | 9/2012 | Mizuno | G06F 11/3684 702/123 |
| 2012/0304157 | A1* | 11/2012 | Kawashima | G06F 11/3692 717/131 |
| 2013/0041613 | A1* | 2/2013 | Bhide | G06F 11/263 702/123 |
| 2013/0104105 | A1* | 4/2013 | Brown | G06F 11/3664 717/124 |
| 2013/0111267 | A1 | 5/2013 | Beryoza et al. | |
| 2013/0159774 | A1* | 6/2013 | Budnik | G06F 11/3688 714/33 |
| 2014/0040867 | A1* | 2/2014 | Wefers | G06F 11/3684 717/131 |
| 2014/0096111 | A1* | 4/2014 | Mahler | G06F 11/3676 717/124 |
| 2014/0304556 | A1* | 10/2014 | Alexander | G06F 11/2635 714/45 |
| 2014/0325480 | A1 | 10/2014 | Bhagavatula | |
| 2014/0351793 | A1* | 11/2014 | Bartley | G06F 11/3676 717/124 |
| 2014/0380279 | A1* | 12/2014 | Bartley | G06F 11/3676 717/124 |
| 2015/0007140 | A1* | 1/2015 | Boshernitsan | G06F 11/3688 717/124 |
| 2015/0293837 | A1* | 10/2015 | Rajamanickam | G06F 11/3676 717/130 |
| 2016/0004626 | A1* | 1/2016 | Jain | G06F 11/3684 717/130 |
| 2016/0019135 | A1 | 1/2016 | Gotlieb et al. | |
| 2016/0034375 | A1* | 2/2016 | Sinha | G06F 11/3688 717/131 |
| 2016/0117239 | A1* | 4/2016 | Hamilton, II | G06F 11/3684 717/124 |
| 2016/0162392 | A1* | 6/2016 | Hu | G06F 11/3684 714/38.1 |
| 2016/0179659 | A1* | 6/2016 | Champlin-Scharff | G06F 17/271 717/126 |
| 2016/0328314 | A1* | 11/2016 | Yadava | G06F 11/3676 |
| 2017/0046245 | A1* | 2/2017 | Liu | G06F 11/368 |
| 2017/0083432 | A1* | 3/2017 | Dhulipala | G06F 11/3684 |
| 2017/0199811 | A1* | 7/2017 | Narayan | G06F 11/3684 |
| 2017/0262361 | A1* | 9/2017 | Francis | G06F 11/3688 |

OTHER PUBLICATIONS

Alvest et al., Prioritizing test cases for early detection of refactoring faults, Copyright © 2016 John Wiley & Sons, Ltd. (Year: 2016).*

Nardo et al., Coverage-based regression test case selection, minimization and prioritization: a case study on an industrial system, Copyright © 2015 John Wiley & Sons, Ltd (Year: 2015).*

Disclosed Anonymously, "Relating Test Case to Source Through Data Mining of Test Result History," IP.com Prior Art Database Technical Disclosure, IP.com No. IPCOM000198623D, Aug. 10, 2010.

Disclosed Anonymously, "Automatic Progression Regression Testing System," IP.com Prior Art Database Technical Disclosure, IP.com No. IPCOM000197298D, Jul. 1, 2010.

Prasad et al., "Automated Regression Test Suite Optimization Based on Heuristics," 2014, 4th International Conference on Artificial Intelligence with Applications in Engineering and Technology, 6 pages.

IBM, "Automated Test Suite Decomposition for Stateless, Transactional Applications," IP.com Prior Art Database Technical Disclosure, IP.com No. IPCOM000190410D, Nov. 27, 2009.

Yu Chang-yue, Zhang Meng-meng, Dou Ping-an, Yu Xiu-Shan, "ANT Algorithm-Based Regression Test Suite Optimization for GUI Software," China Academic Journal Electronic Publishing House, 1994-2016, http://www.cnki.net, 6 pages.

Frohlich, Peter and Link, Johannes, "Automated Test Case Generation From Dynamic Models," ECOOP 2000, LNCS 1850, pp. 472-491, 2000.

* cited by examiner

| 605 | Function1 | Function2 | Function3 |
|---|---|---|---|
| TC[0] | Y | N | N |
| TC[1] | Y | Y | Y |
| TC[2] | N | N | N |

| 610 | Function1 | Function2 | Function3 |
|---|---|---|---|
| P0 | N | Y | N |
| P1 | Y | Y | Y |
| P2 | N | N | N |

FIG. 6

| | P0 | P1 | P2 | Total |
|---|---|---|---|---|
| TC[0] | 0 | 1 | 0 | 1 |
| TC[1] | 1 | 3 | 0 | 4 |
| TC[2] | 0 | 0 | 0 | 0 |

FOCUS AREA INTEGRATION TEST HEURISTICS

BACKGROUND

The present disclosure relates to functional verification testing, and more specifically, to determining an optimal set of tests for a product release (e.g., of software or firmware).

During the lifetime of a software product, developers may release service packs to the software that provides additional functionality. For example, firmware for a microprocessor might periodically receive service packs corresponding to a new release of the firmware. The service packs can include multiple patches providing significant changes to the firmware, such as the addition of major functions. Prior to release, each patch is tested for quality assurance. To do so, a developer may prepare and execute automated test cases to functionally verify areas of development code modified or added by the patch. Practice guidelines for these test cases often require that the test cases cover any affected areas of development code comprehensively. That is, the result of an execution of a bucket of test cases must ensure that each affected area of code is executed. Further, if any test cases fail, the developer goes back to the relevant code to address issues raised by the test cases. Test cases help minimize bugs in the software updates that are subsequently released.

A typical software product may be associated with a number of automated test cases. Further, with each subsequent release of the software product, the number of test cases increases. Consequently, executing an entire bucket of test cases may be less than optimal. For example, a developer may prepare test cases that cover an area of code containing the new features provided by a release patch. In some scenarios, previously created test cases already cover the area of code, thus rendering the new test cases redundant. Executing unnecessary test cases can cause a burden on a testing system as well as developer resources.

SUMMARY

One embodiment presented herein discloses a method. The method generally includes receiving a plurality of test cases for executing on a release of software, wherein the release includes one or more patches modifying development code of a previous release of the software. Each test case includes metadata specifying a history of the test case relative to an execution on the previous release. For each test case, it is determined based on the metadata whether at least a first test case targets the development code modified by the patch, and, if so, a score associated with the at least the first test case is incremented. The at least the first test case is prioritized for execution based on the score.

Another embodiment presented herein discloses a computer program product having a computer-readable storage medium. The computer-readable storage medium stores instructions, which, when executed on a processor, performs an operation. The operation itself generally includes receiving a plurality of test cases for executing on a release of software, wherein the release includes one or more patches modifying development code of a previous release of the software. Each test case includes metadata specifying a history of the test case relative to an execution on the previous release. For each test case, it is determined based on the metadata whether at least a first test case targets the development code modified by the patch, and, if so, a score associated with the at least the first test case is incremented. The at least the first test case is prioritized for execution based on the score.

Yet another embodiment presented herein discloses a system having a processor and a memory. The memory stores program code, which, when executed on the processor, performs an operation. The operation itself generally includes receiving a plurality of test cases for executing on a release of software, wherein the release includes one or more patches modifying development code of a previous release of the software. Each test case includes metadata specifying a history of the test case relative to an execution on the previous release. For each test case, it is determined based on the metadata whether at least a first test case targets the development code modified by the patch, and, if so, a score associated with the at least the first test case is incremented. The at least the first test case is prioritized for execution based on the score.

DETAILED DESCRIPTION

Embodiments presented herein disclose techniques for identifying automated test cases to execute on patches associated with a software release. In particular, the techniques relate to evaluating test case coverage metadata, previous bug reports, and information on new patches since a previous software cycle to determine an optimal test suite to execute. In one embodiment, a testing tool executing on a computer system is provided to identify the test suites. For instance, if a new software release becomes available for testing, the testing tool may evaluate the patches associated with the new release. The patches may indicate what area of development code has changed and code coverage data that a test case should be able to execute. The testing tool may use this information to determine, iteratively through each patch, whether any currently existing automated test case covers the code. The testing tool may score the test case accordingly.

In addition, identifying areas of code that are not covered by any currently existing automated test cases allows the testing tool to generate notifications for a development team to create test cases for that code. Doing so eliminates manual guesswork for a developer in determining whether to create a test case for a new functionality provided by a patch. That is, currently existing test cases may be sufficient to test a new feature if that test case provides coverage for the area of code impacted by the feature. And if no such test cases exist, the developer can review notifications generated by the testing tool and accordingly create a test case.

Further, in one embodiment, the testing tool also evaluates test case history associated with a developer. More specifically, in previous release cycles, a test case might fail at a certain area of code with which a developer was involved. When the test fails, the testing tool may create metadata associating that developer with the test case. During a subsequent release, the testing tool may obtain such history and add the test case as one that should be executed during the current run of test cases.

Advantageously, embodiments presented herein identify a minimum amount of test cases that will maximize code coverage over the release when executed. In particular, this approach prioritizes test cases by incorporating test code coverage data, test case history, bug reports, and information on new release patches to derive an optimal set of test cases to execute over a software release. Consequently, rather than execute an entire suite of test cases, an underlying computing system performing the tests performs the derived set of test cases on the software release, thereby improving resource utilization and performance of the computing system. Further, by executing test cases from the identified set, the computer system is able to more quickly ascertain bugs and defects earlier in the testing cycle. Further still, identifying previous test cases associated with a given developer allows for a comprehensive testing on impacted areas of code that the developer modified in the new release.

Figure 1:
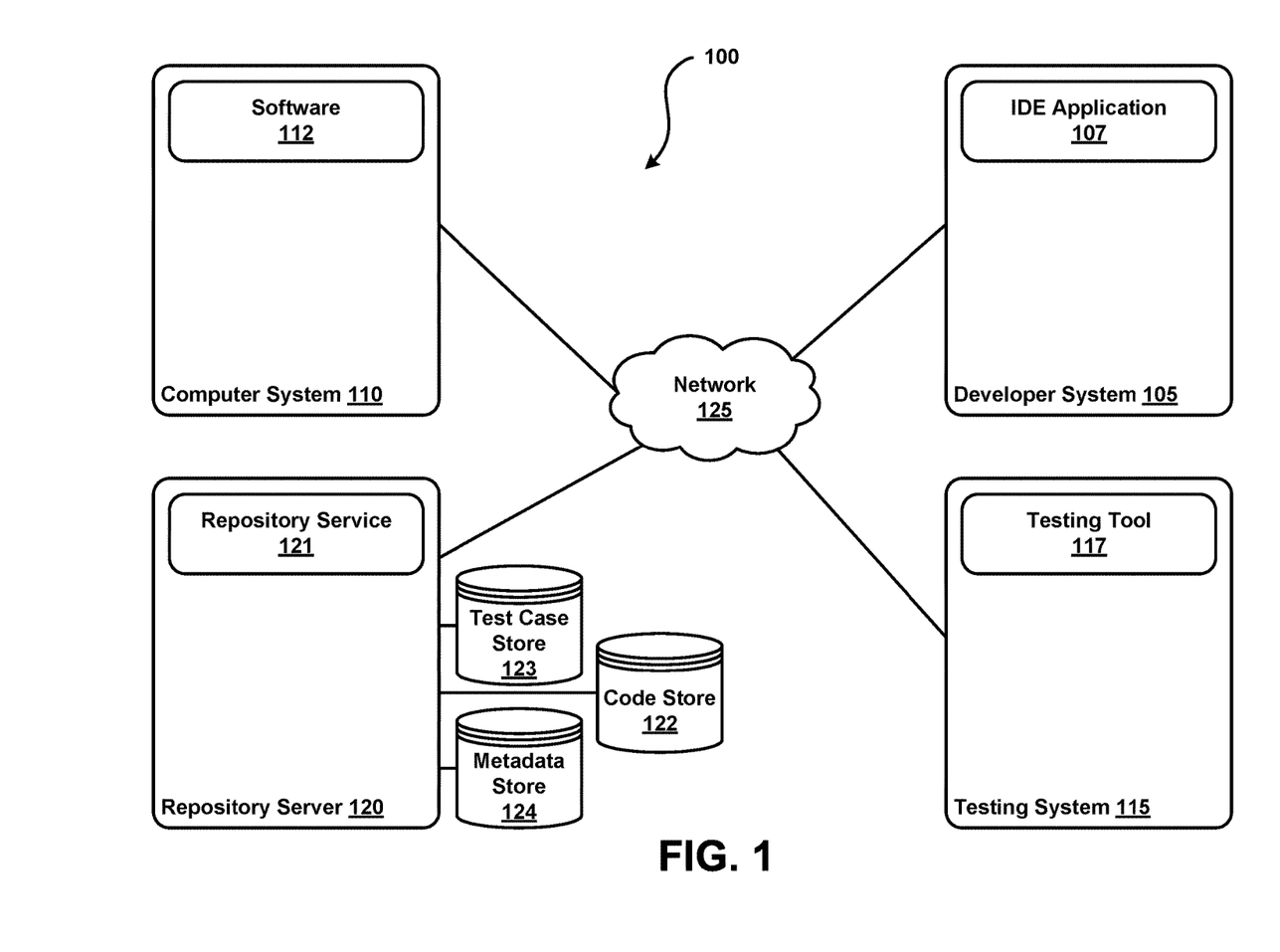
FIG. 1 illustrates an example computing environment, according to one embodiment.

FIG. 1 illustrates an example computing environment 100, according to one embodiment. As shown, the computing environment 100 includes a developer system 105, a computer system 110, a testing system 115, and a repository server 120, each interconnected via a network 125 (e.g., the Internet, local area network, virtual private network provided by a cloud service, etc.). Each of the developer system 105, computer system 110, testing system 115, and repository server 120 may correspond to a physical computing system (e.g., desktop computer, workstation, laptop computer, etc.) or a virtual computing instance executing on the cloud.

Illustratively, the developer system 105 includes an integrated development environment (IDE) application 107 that provides editing, build automation, and debugging tools that a developer may use to create and modify software, such as applications, scripts, and automated tests. In the context of the present disclosure, a development team may create a new build or release of pre-existing software via the IDE application 107. Examples of software can include productivity application, firmware for a hardware component, computing services, etc. Such software may be deployed to a given environment, e.g., as software 112 executing on a computer system 110. Development code in a new release of software 112 includes changes from the previous release, where changes include added functionalities to the software, bug fixes, and other modifications.

The repository server 120 includes a repository service 121. The repository service 121 provides version control and hosting for software development projects. The repository server 120 further provides a code store 122, test case store 123, and a metadata store 124. For instance, a developer may create or modify development code and commit changes to the code store 122. The code store 122 also maintains builds of software as part of packages. A package contains patches used to update the software 112 to a corresponding version of the build. A given patch may modify an existing area of development code for the software 112.

The test case store 123 provides automated tests for verifying a given build of software. For example, the test case store 123 may include regression tests used to verify that functional flows of the software 112 still perform correctly after new functionalities are added. As another example, the test case store 123 includes functional verification tests that use a solution specification document, design documents, and use case documents associated with the software 112 to validate proper functioning of software features. Other test cases may measure code coverage and verify that portions of code for the software 112 is executed. Generally, numerous test cases are associated with a given software project, e.g., in the thousands.

The metadata store 124 maintains information describing files stored in the code store 122 and the test case store 123. For instance, examples of information describing a release patch include descriptions of the patch, developers associated with creating or working on the patch, areas of code or files modified by the patch, and so on. Examples of information describing a test case may include a type of the case, areas of development code that are targeted by the test case, results of previous executions of the test case, developers associated with previous executions that have resulted in failure, and the like. Metadata associated with a given file may be stored in, e.g., a markup language file (such as an XML or JSON file), spreadsheet file, etc.

In one embodiment, the testing server 115 includes a testing tool 117. The testing tool 117 executes test cases associated with a given software project. For example, the testing tool 117 retrieves test cases from the test case store 123 associated with a new release in the software 112 that is available for testing. The testing tool 117 provides modules for determining code coverage, impact analysis, and the like. As will be further described below, the testing tool 117 uses metadata associated with release patches and test cases to identify an optimal set of test cases to execute on the software release, such that not all of the existing test cases for the software 112 need to be executed.

Figure 2:
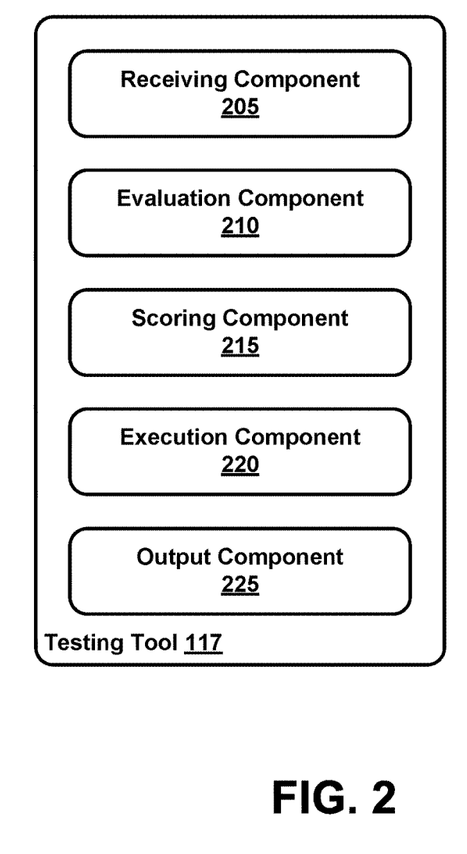
FIG. 2 further illustrates the testing tool described relative to FIG. 1, according to one embodiment.

FIG. 2 further illustrates the testing tool 117, according to one embodiment. More specifically, FIG. 2 presents a conceptual diagram of the process steps performed by the testing tool 117 used to identify a minimal and/or optimal set of test cases to execute over patches associated with a software release. One of skill in the art will recognize that the actual allocation of process steps in practice may vary substantially from this illustration. As shown, the testing tool 117 provides a receiving component 205, an evaluation component 210, a scoring component 215, an execution component 220, and an output component 225.

The receiving component 205 obtains a request to execute test cases on a specified software release. The request may include an identifier associated with the specified release, which allows the receiving component 205 to retrieve patches associated with the release of the software 112 from the code store 122. Further, the receiving component 205 may also retrieve (e.g., using the identifier) a bucket including the test cases associated with the software release from the test case store 123. Further still, the receiving component 205 may also retrieve metadata associated with the patches and the test cases from the metadata store 124.

The evaluation component 210 iteratively analyzes the patches based on the obtained metadata. For example, the evaluation component 210 identifies areas of development code of the software 112 changed by the patches. Metadata associated with the patch may provide such information to the evaluation component 210. In addition, the evaluation component 210 may also compare changes in code between the present release and a release preceding the present release to identify changes in code.

As another example, the evaluation component 210 performs impact analysis to identify areas of development code affected by the patch. To do so, the evaluation component 210 may process specified rules for identifying an impact of changes to the software 112. Further, the evaluation component 210 determines whether test cases associated with the software 112 targets areas of code affected by a given patch. The metadata associated with each test case may indicate which areas of code are targeted by the test case, e.g., providing file names, line numbers, a description of the area of code, an identifier associated with the area of code, etc. In one embodiment, the evaluation component 210 determines the targeted areas of a test case using the metadata.

Further still, the evaluation component 210 determines code coverage associated with a given test case. Code coverage represents a measure used to describe a degree to which development code is tested by the test case. The evaluation component 210 may determine code coverage associated with a test case based on test case history, e.g., provided by metadata associated with the test case. The test case history may include results of a given test case, details of failures associated with the results (e.g., description of an error, names of developers associated with the area of code or patch, etc.).

Based on distinct changes introduced in the new release (as determined through the areas of code that have changed, impacted areas of code, and code coverage data), the evaluation component 210 may identify and prioritize test cases to execute over the new release. For example, the evaluation component 210 determines, for each release patch, whether a test case covers a functional path of a given patch. The scoring component 215 may then score the test case based on the result, such as by incrementing a counter associated with the patch. Further, the scoring component 215 may also increment a score of the patch that the test case covers.

In addition, the scoring component 215 may score the test case based on a developer that is associated with a given test case. The evaluation component 210 can determine whether a developer is associated with a given test case based on metadata for the test case. For instance, metadata may describe whether a test case failed on an area of code authored by a developer. In such a case, the scoring component 215 may increment the score based on this information.

In one embodiment, the higher the score associated with a test case, the higher the priority. In addition, the higher the score associated with a patch indicates that the patch has relatively high test case coverage. The execution component 220 selects and performs test cases based on the scores associated with each. For example, the execution component 220 may execute test cases having a non-zero score value. The output component 225 generates a notification (e.g., a plaintext notification to be presented on a user interface provided by the testing tool 117) providing the results of the executed test cases.

In some cases, a patch might have a zero score value. A zero score value for a patch indicates that none of the existing test cases in the bucket cover the patch. In such a case, the output component 225 generates a notification, e.g., for presentation to the development team directing the team to create test cases for the patch. In one embodiment, the output component 225 also returns a test case bucket resulting from the evaluation of the test cases and patches. The test cases in the bucket represent the optimal subset of test cases from the overall set.

Figure 3:
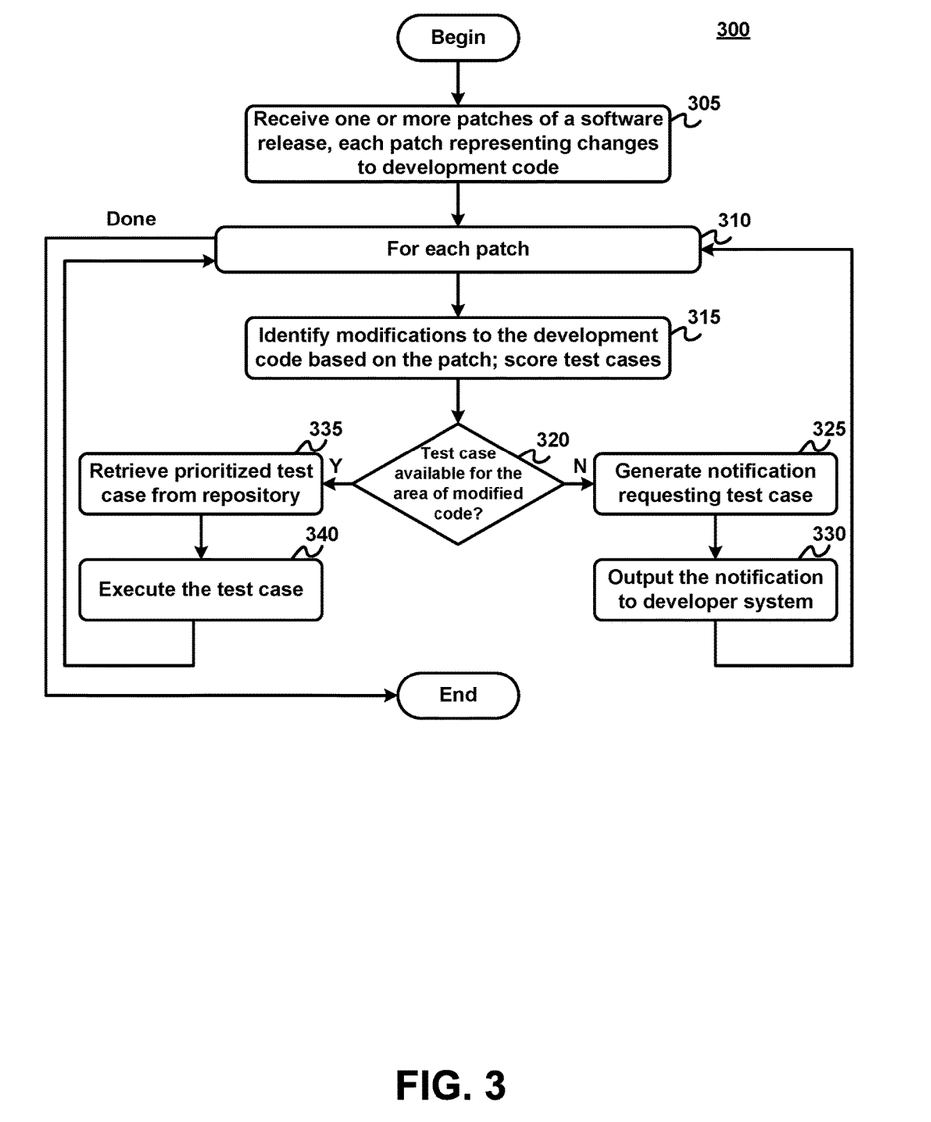
FIG. 3 illustrates a method for executing test cases on one or more patches associated with a release, according to one embodiment.

FIG. 3 illustrates a method 300 for executing test cases on one or more patches associated with a release, according to one embodiment. In particular, method 300 provides a high-level description of the process steps performed by the testing tool 117. As shown, the method 300 starts at step 305, where the receiving component 205 obtains one or more patches of a software release. Each patch includes changes to underlying development code of the software 112.

At step 310, the method 300 enters a loop for each patch for steps 315 to 340. At step 315, the evaluation component 210 identifies modifications to the development code based on the patch and metadata associated with the patch. For instance, the evaluation component 210 identifies an area of code affected by the patch, such as code directly changed or impacted by the patch, using the metadata associated with the patch. Further, the evaluation component 210 determines test case coverage of the patch, and the scoring component 215 may increment a score associated with the patch and each test case accordingly. This determination and scoring is further discussed relative to FIGS. 4 and 5.

At step 320, the evaluation component 210 determines whether a test case is available for an area of modified code. For example, the evaluation component 210 may determine whether the score associated with the patch is a non-zero value. A score associated with the patch is zero indicates that no test cases are available. In such a case, at step 325, the output component 220 generates a notification requesting a test case from a developer associated with the patch. At step 330, the output component 225 sends the notification to the developer system 105.

Otherwise, at step 335, the execution component 220 retrieves a prioritized test case from the test case store 123. To do so, the execution component 220 identifies a test case that targets the patch based on score. For instance, the execution component 220 may select the test case having the highest score out of the set of test cases that cover the area of development code. The execution component 220 may then query the repository service 121 for the selected test case, and in turn, the repository service 121 transmits the test case to the testing tool 117. At step 340, the execution component 220 runs the selected test case. The execution component 220 may obtain results of the test case, e.g., what was performed, whether the test case succeeded or failed, etc. And the output component 225 may generate result data that can then be sent to the developer system 105 for display or logging.

Figure 4:
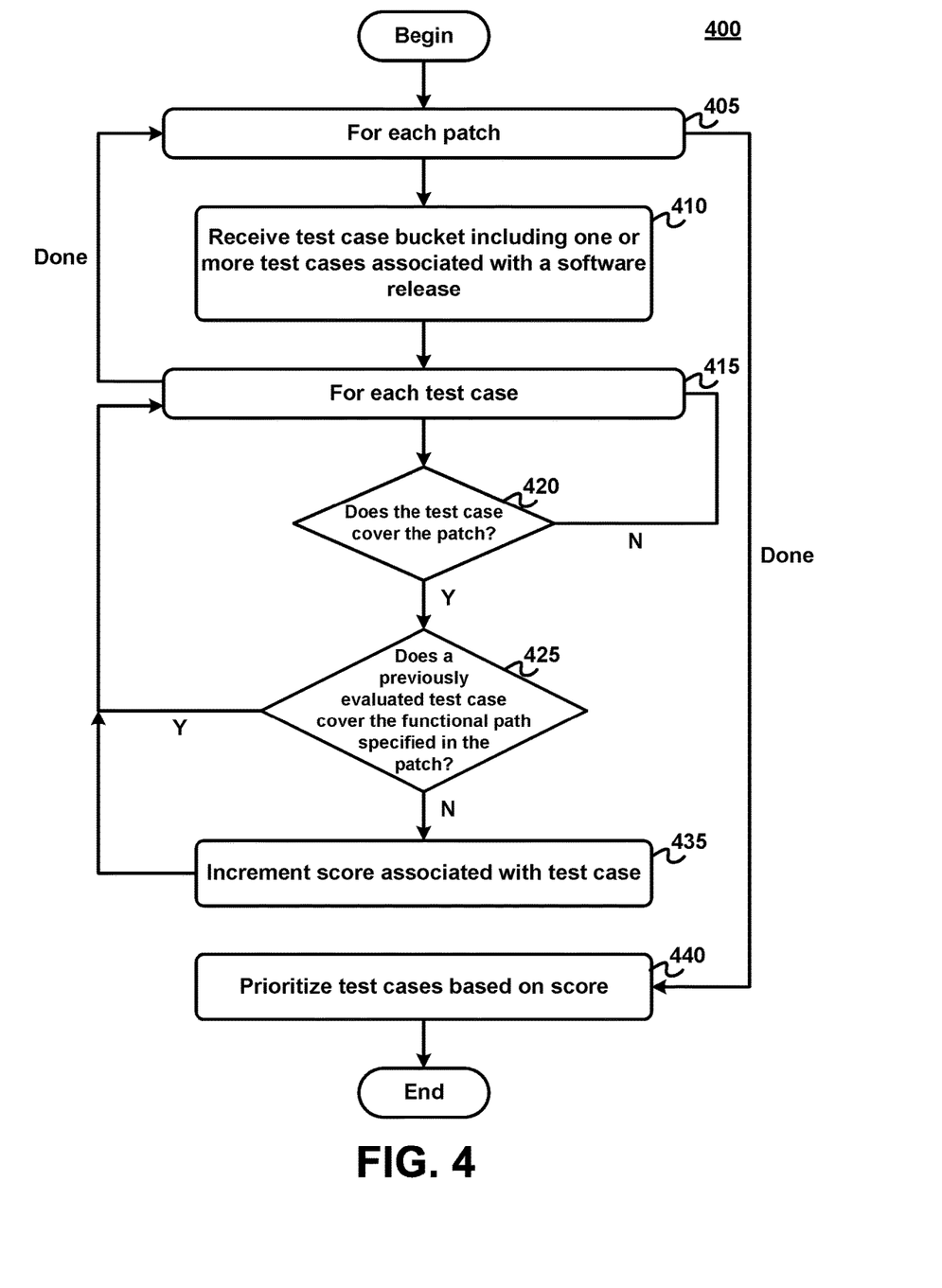
FIG. 4 illustrates a method for determining which test cases to execute on a software release, according to one embodiment.

FIG. 4 illustrates a method 400 for determining which test cases to execute on a software release, according to one embodiment. As shown, method 400 begins at step 405, where the testing tool 117 enters a loop for each patch associated with a given release. At step 410, the receiving component 205 obtains a test case bucket associated with the release. For example, the receiving component 205 obtains the test case bucket in response to a request from the developer system 105 to execute test cases on the release.

At step 415, the method 400 enters a loop for each test case in the bucket for step 420 to step 435. At step 420, the evaluation component 210 determines whether the test case covers the current patch. The evaluation component 210 may evaluate test case metadata (e.g., test case history and coverage information) to do so. If not, then the evaluation component 210 iterates to the next test case. Otherwise, then at step 425, the evaluation component 210 determines whether the functional path covered by the test case is already covered by a previously evaluated test case. If so, then the evaluation component 210 iterates to the next test case.

If not, then at step 430, the scoring component 215 increments the score associated with the test case. Further, the scoring component 215 also increments the score associated with the patch. The evaluation component 210 then increments to the next test case. The evaluation component 210 continues to do so until each test case has been evaluated. The testing tool 117 then continues to the next patch until all patches associated with the release are evaluated. At step 440, the testing tool 117 prioritizes the test cases based on score. As a result, the execution component 220 may execute certain test cases over others for a given patch, e.g., if the score for that test case covers that patch and has the highest score out of other test cases covering the patch.

Figure 5:
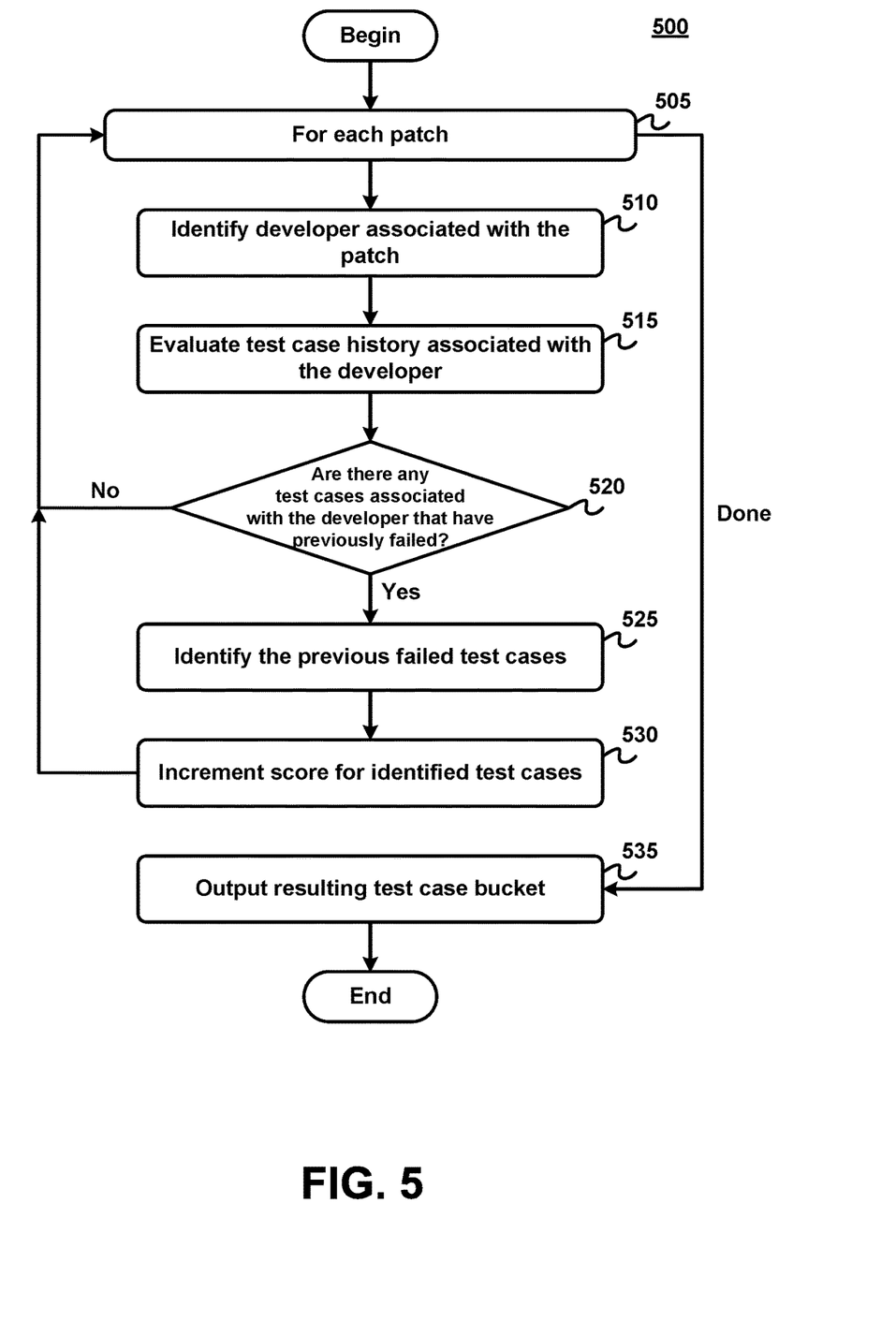
FIG. 5 illustrates a method for determining which test cases to execute on a software release, according to one embodiment.

FIG. 5 illustrates a method 500 for determining which test cases to execute on a software release, according to one embodiment. The method 500 may be performed in parallel with the method 400, or before or after method 400 is complete. As shown, the method 500 begins at step 505, where the testing tool 117 enters a loop for each patch associated with a software release to be tested. At step 510, the evaluation component 210 identifies one or more developers that authored the patch. For example, the patch may include metadata that includes the name of a development team or developers, e.g., in plaintext, or as an identifier associated with a developer or group of developers. The evaluation component 210 may parse through the metadata to identify the developers associated with the patch.

At step 515, the evaluation component 210 analyzes test case history associated with the developer. Doing so allows the evaluation component 210 to determine if any test cases executing over an area of development code in a previous testing have failed. In such a case it is advantageous to include test cases in a bucket to execute over the new release for patches that have been authored by that developer. To analyze the test case history associated with the developer, the evaluation component 210 may, e.g., query the metadata store 124 for test case metadata that may include the developer name or developer identifier. The evaluation component 210 may then evaluate the relevant metadata for results and determine whether the associated test case(s) failed in a previous run.

At step 520, the evaluation component 210 determines whether any test cases that have previously failed for areas of code associated with the developer exist. If not, then the testing tool 117 iterates to the next patch. Otherwise, then at step 525, the evaluation component 210 obtains identifying information for the test cases based on the metadata. At step 530, the scoring component 215 increments the scores for the identified test cases. Doing so ensures that these test cases are performed on the patch. At step 535, the output component 225 returns the resulting test case bucket, which represents the optimal test case bucket in the overall set of test cases.

Figure 6:
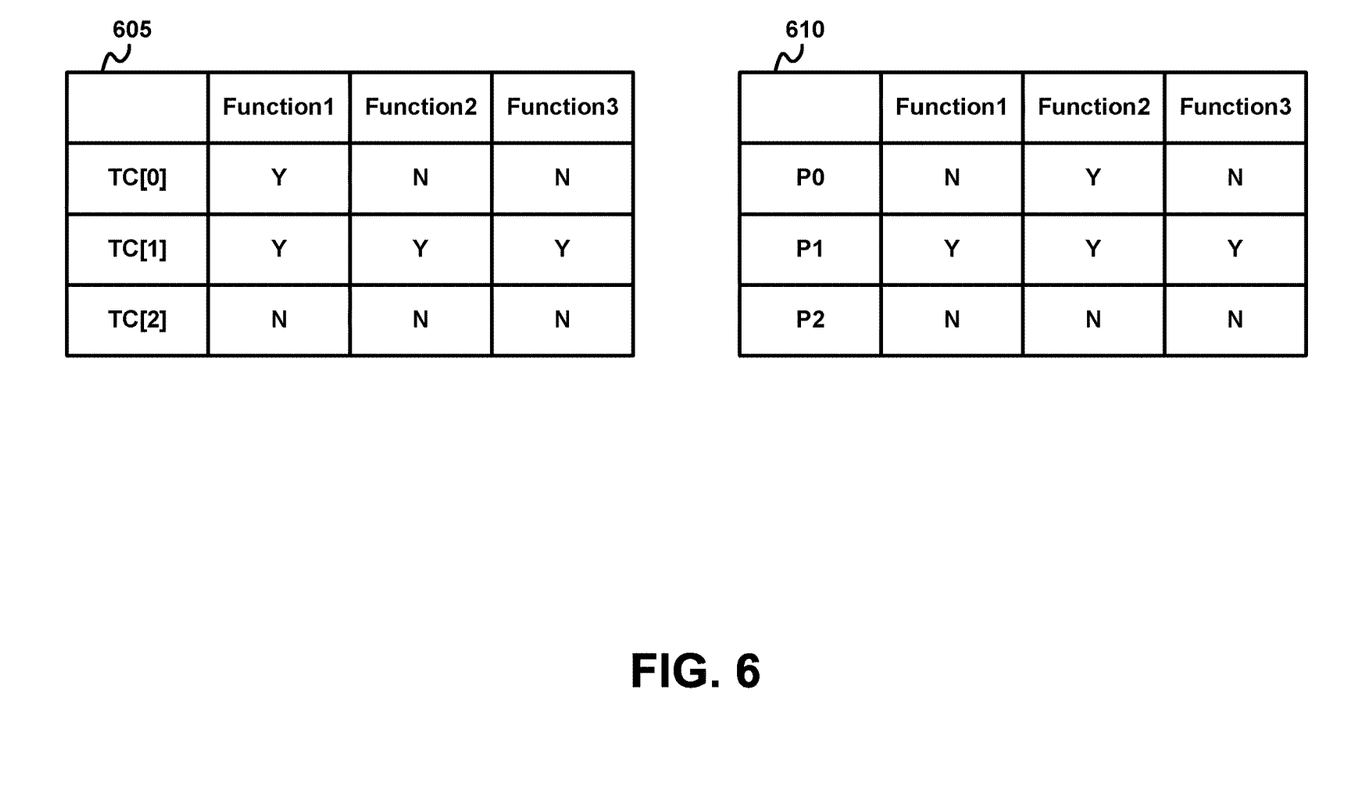
FIG. 6 illustrates example tables depicting functional test case coverage history and changes to functions by release patches, according to one embodiment.

FIG. 6 illustrates example tables depicting functional test case coverage history and changes to functions by release patches, according to one embodiment. In particular, table 605 displays a functional test case coverage history for test cases TC[0], TC[1], and TC[2] for functions Function1, Function2, and Function3. And table 610 displays patches P0, P1, and P2, each part of a new release for the software 112, and changes in each patch affecting Function1, Function2, and Function3.

Illustratively, table 605 shows test case TC[0] as covering Function1 but not Function2 and Function3; TC[1] as covering Function1, Function2, and Function 3; and TC[2] not covering any of Function1, Function2, or Function3. Further, table 610 shows patch P0 as affecting Function2 but not Function1 and Function3; P1 as affecting Function1, Function2, and Function3; and P2 as not affecting any of Function1, Function2, or Function3.

In one embodiment, the evaluation component 210 may determine such information provided in the tables based on information describing each of the test cases and patches, e.g., as provided in metadata maintained in the metadata store 124. Once determined, the scoring component 215 may increment test case scores accordingly, which are then used to prioritize the test cases during execution of the test case bucket on the release of software 112.

Figure 7:
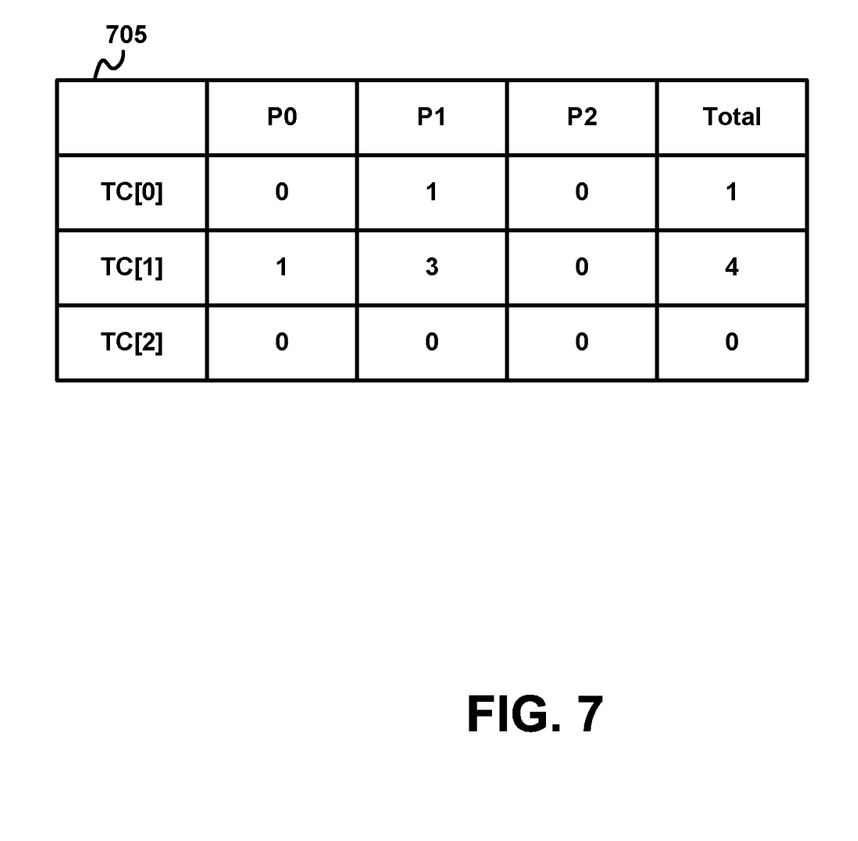
FIG. 7 illustrates an example table representing test coverage for release patches, according to one embodiment.

FIG. 7 illustrates an example table 705 representing test coverage for release patches, according to one embodiment. More specifically, the table 705 presents scores for the test cases TC[0], TC[1], and TC[2] described relative to FIG. 6. Illustratively, the test case TC[0] is shown as having a score of 1, as the TC[0] provides test case coverage for patch P1 for Function1. TC[1] is shown as having a total score of 4, as the TC[1] provides test case coverage for patch P0 for Function2 and for patch P1 for Function1, Function2, and Function3. And TC[2] is shown as having a total score of 0, because TC[2] does not test development code associated with any of the patches P0, P1, and P2.

In such a case, the execution component 220 performs TC[1] as the highest priority test in the bucket, followed by TC[0]. Further, the output component 225 generates a notification to transmit to the developer system 105. The notification may instruct the developers to create a test case for patch P2 because the existing test cases do not target that patch.

Figure 8:
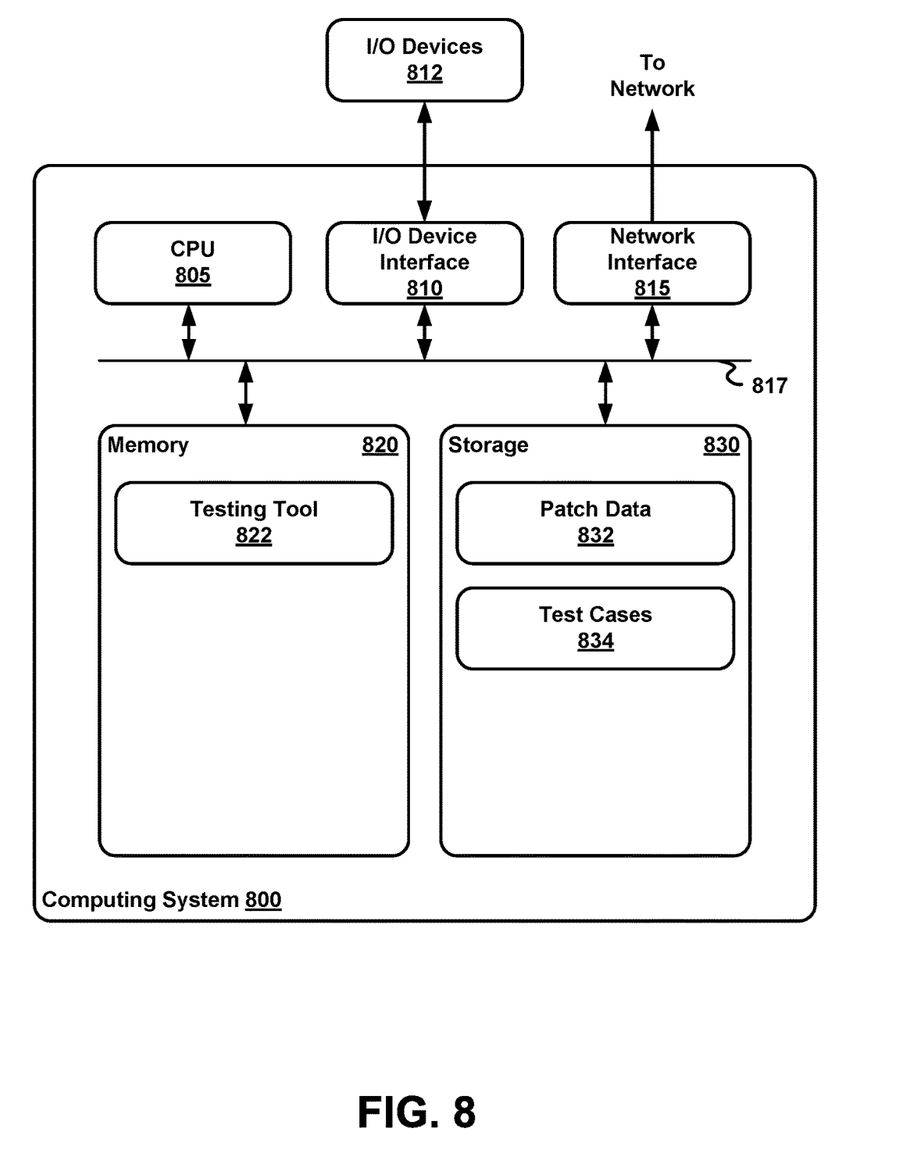
FIG. 8 illustrates an example computing system that determines which test cases to execute on a software release, according to one embodiment.

FIG. 8 illustrates an example computing system 800 that identifies an optimal set of automated test cases to execute on a software release, according to one embodiment. As shown, the computing system 800 includes, without limitation, a central processing unit (CPU) 805, a network interface 815, a memory 820, and storage 830, each connected to a bus 817. The computing system 800 may also include an I/O device interface 810 connecting I/O devices 812 (e.g., keyboard, display, mouse devices, etc.) to the computing system 800. Further, in context of the present disclosure, the computing elements shown in the computing system 800 may correspond to a physical computing system (e.g., a system in an enterprise network) or a virtual computing instance.

CPU 805 retrieves and executes programming instructions stored in memory 820 as well as stores and retrieves application data residing in the storage 830. The bus 817 is used to transmit programming instructions and application data between CPU 805, I/O devices interface 810, storage 830, network interface 815, and memory 820. Note, CPU 805 is included to be representative of a single CPU, multiple CPUs, a single CPU having multiple processing cores, and the like. Memory 820 is generally included to be representative of a random access memory. Storage 830 may be a disk drive storage device. Although shown as a single unit, storage 830 may be a combination of fixed and/or removable storage devices, such as fixed disc drives, removable memory cards, or optical storage, network attached storage (NAS), or a storage area-network (SAN).

Illustratively, memory 820 includes a testing tool 822. And storage 830 includes patch data 832 and test cases 834, each associated with a software release to be tested by the testing tool 832. The testing tool 822 provides a framework for verifying the functionality of a software release, including modifications to functions provided by patch data 832. The testing tool 117 evaluates metadata associated with the patches and the test cases, such as test case history, developer information of each patch, previous bug reports, and the like, to determine an optimal set of the test cases 834 to perform on the patch data 832 corresponding to a software release. For instance, the testing tool 822 may score each of the patches and the test cases based on the metadata. In particular, the testing tool 822 may score the patches based on whether any of the test cases 832 cover a given patch. A patch having a zero value allows the testing tool 822 to, e.g., notify a developer system that the patch needs a test case written. And the testing tool 822 may score the test cases based on the overall coverage that a given test case provides for the patch data 832. Doing so allows the testing tool 822 to prioritize the execution of the test cases based on the overall score of each test case.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., the testing tool) or related data available in the cloud. For example, the testing tool could execute on a computing system in the cloud and identify an optimal set of test cases to perform on a given software release. In such a case, the testing tool could retrieve and evaluate metadata associated with the software release and score the test cases based on the metadata. Therefore, the testing tool could store the identified set of test cases at a storage location in the cloud for execution. Doing so allows a user to access this information from any computing system attached to a network connected to the cloud (e.g., the Internet).

While the foregoing is directed to embodiments of the present disclosure, other and further embodiments may be devised without departing from the basic scope thereof, and the scope thereof is determined by the claims that follow.

What is claimed is:

1. A computer-implemented method to reduce a processing overhead incurred in testing areas of development code impacted by a target release of software, the computer-implemented method comprising:
   receiving a test case bucket containing a plurality of test cases for executing on the target release of the software, wherein the target release includes one or more patches, each patch of which modifies a respective area of development code of a previous release of the software, wherein each test case is associated with a respective, candidate score and specifies a history of the respective test case relative to an execution on the previous release;
   upon determining, for each of the one or more patches, a respective test case, of the plurality of test cases, that targets the area of development code modified by the respective patch, incrementing the candidate score associated with the respective test case;
   for each patch, identifying one or more developers associated with the respective patch based on metadata of the respective patch;
   evaluating a test case history associated with the respective one or more developers to determine existence of one or more test cases that have previously failed and that are associated with the respective one or more developers;
   upon determining the existence of the one or more test cases, obtaining identifying information for the one or more test cases based on the metadata and incrementing a score for each of the one or more test cases, wherein the one or more test cases are included in the test case bucket; and
   prioritizing, by operation of one or more computer processors and based on the score of each test case, execution of the test cases in the test case bucket during execution of the test case bucket on the target release of the software, wherein the test case having the highest score from the test case bucket is selected and executed first.

2. The computer-implemented method of claim 1, wherein each test case further specifies a respective code coverage measure and a respective impact measure of the test case.

3. The computer-implemented method of claim 1, wherein the computer-implemented method is performed by an application comprising a testing tool, wherein the testing tool comprises a plurality of components, the plurality of components including a receiving component, an evaluation component, a scoring component, an execution component, and an output component;
 wherein the test case bucket is received by a receiving component of the testing tool, wherein the respective test case is determined by an evaluation component of the testing tool, wherein the candidate score is incremented by a scoring component of the testing tool, wherein the execution is prioritized by an execution component of the testing tool, wherein an output of the first test case is output by an output component of the testing tool;
 wherein the testing tool is operatively connected via a network to an integrated development environment (IDE) application, the software, and a repository service, wherein the testing tool, the IDE application, the software, and the repository service each execute on a respective, distinct computer, wherein the repository service is configured to provide access to a test case store, a code store, and a metadata store.

4. The computer-implemented method of claim 3, wherein the code store maintains a plurality of different releases of the software, wherein the test case store provides automated tests for verifying each release of the software, the automated tests including functional verification tests, regression tests, code coverage measurement tests, and code execution verification tests;
 wherein the metadata store maintains information describing files stored in the code store and the test case store, respectively, wherein the information includes patch descriptions, patch developers, modified code, modified files, targeted code areas, previous test results, and patch developers associated with failed test results.

5. The computer-implemented method of claim 1, wherein the computer-implemented method is performed by a testing tool.

6. The computer-implemented method of claim 5, wherein the testing tool includes at least two of a receiving component, an evaluation component, a scoring component, an execution component, and an output component.

7. The computer-implemented method of claim 5, wherein the testing tool is operatively connected via a network to at least two of an integrated development environment (IDE) application, the software, and a repository service.

8. The computer-implemented method of claim 1, wherein each test case further specifies at least one of a respective code coverage measure and a respective impact measure of the test case.

9. A computer program product to reduce a processing overhead incurred in testing areas of development code impacted by a target release of software, the computer program product comprising:
 a computer-readable storage medium storing instructions which, when executed on one or more computer processors, performs one or more operations comprising:
  receiving a test case bucket containing a plurality of test cases for executing on the target release of the software, wherein the target release includes one or more patches, each patch of which modifies a respective area of development code of a previous release of the software, wherein each test case is associated with a respective, candidate score and specifies a history of the respective test case relative to an execution on the previous release;
  upon determining, for each of the one or more patches, a respective test case, of the plurality of test cases, that targets the area of development code modified by the respective patch, incrementing the candidate score associated with the respective test case;
  for each patch, identifying one or more developers associated with the respective patch based on metadata of the respective patch;
  evaluating a test case history associated with the respective one or more developers to determine existence of one or more test cases that have previously failed and that are associated with the respective one or more developers;
  upon determining the existence of the one or more test cases, obtaining identifying information for the one or more test cases based on the metadata and incrementing a score for each of the one or more test cases, wherein the one or more test cases are included in the test case bucket; and
  prioritizing, based on the score of each test case, execution of the test cases in the test case bucket during execution of the test case bucket on the target release of the software, wherein the test case having the highest score from the test case bucket is selected and executed first.

10. The computer program product of claim 9, wherein each test case further specifies a respective code coverage measure and a respective impact measure of the test case.

11. The computer program product of claim 9, wherein the one or more operations are performed by a testing tool.

12. The computer program product of claim 11, wherein the testing tool includes at least two of a receiving component, an evaluation component, a scoring component, an execution component, and an output component.

13. The computer program product of claim 11, wherein the testing tool is operatively connected via a network to at least two of an integrated development environment (IDE) application, the software, and a repository service.

14. The computer program product of claim 9, wherein each test case further specifies at least one of a respective code coverage measure and a respective impact measure of the test case.

15. A system to reduce a processing overhead incurred in testing areas of development code impacted by a target release of software, the system comprising:
 one or more computer processors; and
 a memory storing program code, which, when executed on the one or more computer processors, performs one or more operations comprising:
  receiving a test case bucket containing a plurality of test cases for executing on the target release of the software, wherein the target release includes one or more patches, each patch of which modifies a respective area of development code of a previous release of the software, wherein each test case is associated with a respective, candidate score and specifies a history of the respective test case relative to an execution on the previous release;
  upon determining, for each of the one or more patches, a respective test case, of the plurality of test cases, that targets the area of development code modified by the respective patch, incrementing the candidate score associated with the respective test case;
  for each patch, identifying one or more developers associated with the respective patch based on metadata of the respective patch;
  evaluating a test case history associated with the respective one or more developers to determine existence of one or more test cases that have previously failed and that are associated with the respective one or more developers;

upon determining the existence of the one or more test cases, obtaining identifying information for the one or more test cases based on the metadata and incrementing a score for each of the one or more test cases, wherein the one or more test cases are included in the test case bucket; and prioritizing, based on the score of each test case, execution of the test cases in the test case bucket during execution of the test case bucket on the target release of the software, wherein the test case having the highest score from the test case bucket is selected and executed first.

16. The system of claim 15, wherein each test case further specifies a respective code coverage measure and a respective impact measure of the test case.

17. The system of claim 15, wherein the one or more operations are performed by a testing tool.

18. The system of claim 17, wherein the testing tool includes at least two of a receiving component, an evaluation component, a scoring component, an execution component, and an output component.

19. The system of claim 17, wherein the testing tool is operatively connected via a network to at least two of an integrated development environment (IDE) application, the software, and a repository service.

20. The system of claim 15, wherein each test case further specifies at least one of a respective code coverage measure and a respective impact measure of the test case.

* * * * *